Aug. 16, 1949.
C. L. KITE
2,479,371
FLAT TIRE DETECTOR
Filed Dec. 12, 1947
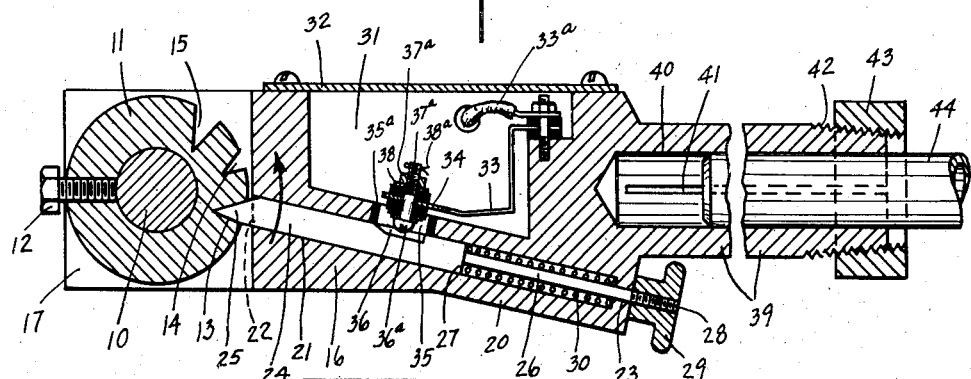
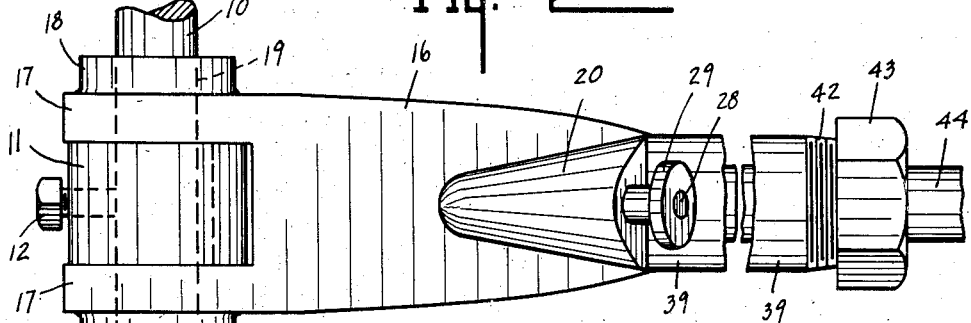
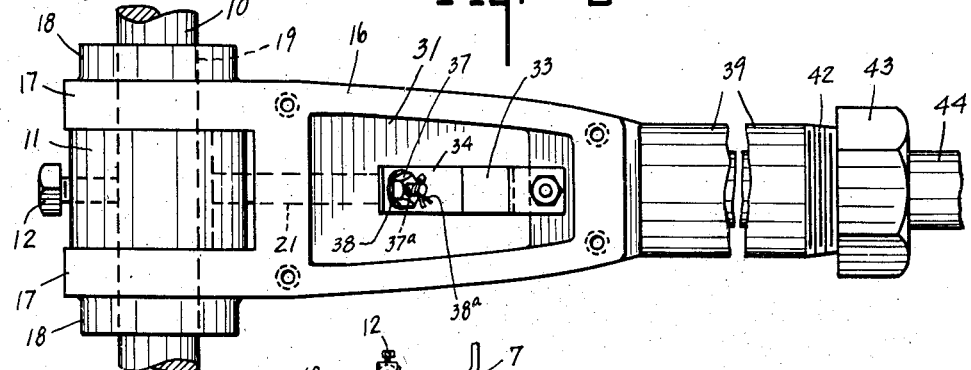
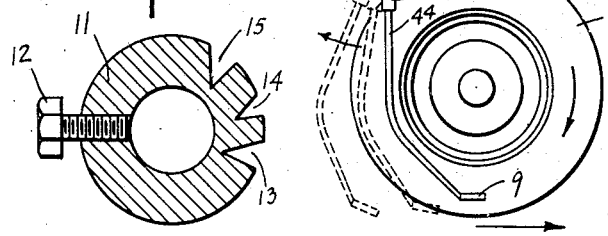
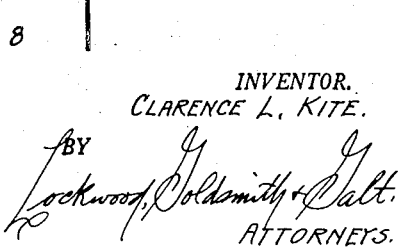
INVENTOR.
CLARENCE L. KITE.
BY
Lockwood, Goldsmith & Galt
ATTORNEYS.

Patented Aug. 16, 1949

2,479,371

UNITED STATES PATENT OFFICE 2,479,371

FLAT TIRE DETECTOR

Clarence L. Kite, Radnor, Ind., assignor of two-thirds to Pauline E. Kite and one-third to Ira Benson, Logansport, Ind.

Application December 12, 1947, Serial No. 791,395

11 Claims. (Cl. 200—58)

This invention relates to a flat or unduly deflated tire detector and more particularly to one capable of use with dual tires.

This application is a continuation-in-part of application Serial No. 731,654, filed February 28, 1947, and entitled "Flat tire detector."

This invention in common with that disclosed in said copending application and the Kite Patent No. 2,213,782, dated September 3, 1940, when applied to dual tires, includes an active element disposed between the tires in such a manner that in normal wheel rotation, that is, forward, when either tire is flat or sufficiently deflated so as to cause injury to the tire, the active element is laterally engaged and tilted for effecting signal indication.

The chief object of the present invention is to simplify the control unit and combined switch disclosed in such patent and application.

The chief feature of the present invention resides in the simplified rugged and enclosed type of construction of such a combined unit and switch.

Other objects and features of the invention will be set forth more fully hereinafter.

The full nature of the invention will be understood from the accompanying drawings and the following description and claims:

In the drawings Fig. 1 is a longitudinal central sectional view of such a unit.

Fig. 2 is an elevational view looking at the unit from the plunger side thereof.

Fig. 3 is an elevational view looking into the switch chamber, the cover plate, if utilized, being omitted.

Fig. 4 is a diagrammatic elevational view of the device applied in offset relation to a wheel, successive dotted line positions indicating the deflated tire and tire changing positions, respectively.

Fig. 5 is a diagrammatic side elevation of a dual tire structure with the invention applied thereto, the outermost wheel being removed, successive dotted lines indicating the signalling and the locked clearance positions of the invention.

In the drawings, 10 indicates a shaft, etc., upon which the unit is pivotally mounted. Suitably secured thereto is control collar 11, as by means of set screw 12. This collar, see Fig. 4, has formed in its periphery three appropriately spaced grooves 13, 14 and 15. These are of differing depths such as illustrated. Groove 13 is that normally employed. Groove 14 is utilized when the puncture or deflation has effected unit movement. Groove 15 is utilized to hold the unit out of use as when it is necessary to remove a tire for repair and examination purposes.

The control unit comprises an elongated body 16 that at one end terminates in a pair of spaced ears 17 adapted to just straddle the collar aforesaid. Each ear includes an outwardly directed boss 18. Said bosses and ears are apertured at 19 to take member 10 and pivotally support the body 16 thereon.

Projecting outwardly in inclined relation to said body is boss 20 which includes central bore 21 that opens at 22 between the ears. The other end of said bore is constricted as at 23.

Slidably mounted in said bore is pawl 24 having exposed tooth portion 25 at the ear exposed end. This pawl is reduced at 26 to form shoulder 27. The reduced end is slidable in and projects externally beyond constriction 23 and is threaded as at 28 to mount knurled head 29.

A spring 30, enveloping the reduced and 26 of the pawl and bearing at opposite ends upon the shoulder 27 and the wall adjacent constriction 23, normally urges the pawl into collar contact. When tooth 25 is seated in groove 13, the actuating end of the unit is trapped and yieldingly held in operative position so as to be tire engaged and tire movable when the tire is flat or sufficiently deflated. When so moved, the pawl, yielding by virtue of compression of spring 30, seats its tooth 25 in groove 14. At this position a warning signal is energized by completion of an electric circuit thereto.

When the tire is to be removed, etc., the unit is manually moved in the same direction until tooth 25 seats in groove 15 whereupon the unit is held elevated until repairs are effected. Then the unit is lowered until tooth 25 is reseated in groove 13 whereupon the device is reconditioned for warning purposes or failure actuation.

In the body 16 is chamber 31, see Figs. 1 and 3. Same may be provided with a detachable suitably secured cover 32 if desired. Insulatably supported in said chamber is spring finger 33 having an apertured end 34 disposed substantially parallel and adjacent to bore 21 but within chamber 31.

The wall defining the bore 21 is apertured as at 35 and may include insulation sleeve 35ª. The pawl 24, when the tooth 25 is seated in groove 13 or 15, registers the notch 36 in said pawl with said aperture 35. When the tooth is seated in groove 14, however, the notch does not so register and circuit completion is effected.

Herein end 34 mounts contact 36ª. Its stem 37ª is adjustably mounted and locked by nut 37 held by suitable locking means as by spring washer 38 and cotter pin 38a. Normally contact 36a not only is seated in aperture 35 but also projects into notch 36 in the pawl 24. However, it then does not contact same or any part of the body.

When, however, the pawl tooth is seated in groove 14 the notch moves to the right, see Fig. 1, so that the pawl now engages contact 36a to complete the circuit. This is now a direct grounding of line 33a. Other forms of switch structures may be pawl actuated. Also while the circuit is disclosed as including a normally open, pawl closable, switch, the structure by reverse formation may readily be arranged for actuation as a normally closed switch pawl operable to open position upon tire deflation.

The tire engageable end 9 may partake of any desired form and same preferably is detachably associated with the projecting end 39 of said control member. This end is tubular as indicated at 40, see Fig. 1, and is longitudinally slotted as at 41. Its outer free end is taper threaded as at 42 to take the internally threaded nut 43. The tubular member or rod 44 is disposed in the tubular portion 40 and adjustably clamped by said nut 43 therein. The other end mounts the tire engageable member 9. The adjustment permits of member positioning for different size tires.

In Fig. 5, 8 indicates a tired wheel and 7 a depending and rearwardly directed support member suitably carried. The rear free end of same terminates in member 10 aforesaid which mounts body 16 directed downwardly and disposed eccentrically, as it were, of the wheel and between the tires of a dual wheel. The circuit extension from wire 33a is not shown.

Note that the body 16 is tapered, see Figs. 2 and 3. Also note that the "active" sides of notches 13 to 15 are radially disposed. The purpose of making notch 14 of lesser depth than notches 13 and 15 is to insure circuit control at notch 14, position and non-control at the other positions. Notch 13 insures predetermined disposition of end 9. Notch 14 insures positive holding in a control position. Notch 15 insures holding in the out of way position. Notch 14 holds the signal.

The operation of this invention will be understood from the foregoing and by reference to said patent so that no further detailed description is believed necessary.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a tire operable switch structure having an arm normally disposed for tire engagement when the tire is sufficiently deflated and tire tiltable when so engaged, and a support pivotally supporting the arm, the combination of a housing having ears at one end and tiltable on the support and supporting at the other end the arm, a multiple grooved collar rigid with the support and straddled by the ears, a pawl slidably supported by the housing and normally constrained to collar engagement, and a switch device carried by the housing and pawl actuable in the tilting of the housing by the arm for circuit control purposes.

2. Structure as defined by claim 1 wherein one of the collar grooves has a greater depth than that of another, the latter depth corresponding to the switch control position of the pawl.

3. Structure as defined by claim 2 wherein the pawl includes a notch juxtapositioned to the switch device and into which a portion of that device freely projects normally, said pawl, when slid incident to housing tilting, engaging said device.

4. Structure as defined by claim 1 wherein the pawl includes a notch juxtapositioned to the switch device and into which a portion of that device freely projects normally, said pawl, when slid incident to housing tilting, engaging said device.

5. Structure as defined by claim 1 wherein the collar grooves are V-shaped in section and the pawl terminates in a V-shaped, groove-seating, tooth.

6. Structure as defined by claim 1 wherein the pawl includes an exposed end adapted for manual engagement to effect pawl retraction from the collar groove when desired.

7. Structure as defined by claim 6 wherein the collar grooves are V-shaped in section and the pawl terminates in a V-shaped, groove seating, tooth, the pawl being axially rotatable to dispose the pawl tooth angularly of the groove direction.

8. Structure as defined by claim 1 wherein the collar grooves are arcuately spaced and V-shaped, one face of each groove being radially disposed in said collar.

9. Structure as defined by claim 1 wherein the housing tapers toward the end remote from the ears for facilitating the accommodation of the tapered end of the housing between a pair of adjacent tires.

10. In a tire operable switch structure having an arm normally disposed for tire engagement when the tire is sufficiently deflated and tire tiltable when so engaged, and a support pivotally supporting the arm, the combination therewith of a housing pivotally supported by the support, locator means confining movement of said housing upon said support substantially to rotation only, a switch device normally carried by the housing, an actuator carried by the housing for device control, and a latch-catch mechanism interposed between the support and the housing and automatically operable in the tilting of the housing by the arm for actuator operation, said mechanism yieldingly holding said housing in selected position and forcibly movable therefrom for purposes described.

11. Structure as defined by claim 10 wherein the support is disposed adjacent the periphery of a pair of axially aligned dual tires and appreciably offset from a vertical plane through the axis of said tires, the housing projecting toward said tires and being disposed between the same.

CLARENCE L. KITE.

REFERENCES CITED

The following references are of record in the file of this patent:

UNITED STATES PATENTS

| Number | Name | Date |
| --- | --- | --- |
| 2,213,782 | Kite | Sept. 3, 1940 |
| 2,289,643 | Furnas et al. | July 14, 1942 |